INVENTOR.
MICHAEL I. BEHR
BY Christie, Parker & Hale
ATTORNEYS.

MULTIPLE STATIONED AND INDEPENDENTLY SELECTIVE TRANSDUCER SYSTEM

Filed April 28, 1967

MULTIPLE STATIONED AND INDEPENDENTLY SELECTIVE TRANSDUCER SYSTEM

Filed April 28, 1967

5 Sheets-Sheet 4

INVENTOR.
MICHAEL I. BEHR
BY Christie, Parker & Hale
ATTORNEYS.

United States Patent Office 3,513,459

Patented May 19, 1970

3,513,459

MULTIPLE STATIONED AND INDEPENDENTLY SELECTIVE TRANSDUCER SYSTEM

Michael I. Behr, South Pasadena, Calif., assignor to Burroughs Corporation, Detroit, Mich., a corporation of Michigan Filed Apr. 28, 1967, Ser. No. 634,696
Int. Cl. G11b *5/00;* H04g *3/42*
U.S. Cl. 340—174.1 6 Claims

ABSTRACT OF THE DISCLOSURE

The data processing system has a plurality of stations, such as tape transports, where information is stored or to be stored. At each station there is located a magnetic transducer that has one core for reading and one core for writing, or a common core for the two functions. Nevertheless, there is also provided a plurality of windings for each function. For example, where two separate cores are provided, there are two or more windings on each core. A winding at each station is connected in common with a winding of every other station and all are connected in common to an electronic unit having read and write amplifiers for each channel as determined by the number of tracks on the magnetic carrier, such as a magnetic tape. In this way the electronic unit containing the amplifiers is shared by the stations. Thereafter, the stations to be read from or stored at are selected by a selection circuit including diode switches in series with the windings on the cores, wherein the selected winding is made useful by forward biasing the series connected diodes. As many functions as there are electronic units may be performed simultaneously e.g., where two electronic units are employed, the functions of read/read from two different stations, read/write at the same or different stations, or write/write at two different stations may be selectively performed.

BACKGROUND OF THE INVENTION

Field of the invention

This invention relates to data processing systems employing magnetic storage means and more particularly to plural winding magnetic transducers sharing plural electronic units for permitting the conduction of two or more read or write functions simultaneously.

In some data processing systems, magnetic carriers such as tapes or discs are employed for the storage of information because of the large permanent storage capabilities of tapes and discs. However, if a large disc or long tape is employed for increased storage capabilities, the information stored on the one continuous tape or the single magnetic disc is not readily available. In other words, the access time or the time required to retrieve stored information or to locate the section where information is to be stored, may be very long. This results in a waste of computer time, since most computers are capable of handling information faster than it can be retrieved from a single magnetic tape or magnetic disc.

The access time may be improved by employing a plurality of tapes or discs in place of the single magnetic carrier. In this way, a shorter length of tape or smaller area of disc will have to be traversed before the desired information may be retrieved or the desired location for storage is reached. A read/write head or a magnetic transducer is provided for each tape or disc, where plural magnetic carriers are employed.

In the past a separate electronic unit or buffer between the data processor and the magnetic carrier was used for each tape or disc. These electronic units include the read or write amplifiers of the system and are not only very expensive but they are very bulky.

As an alternative, it is possible to use a single electronic unit for all of the magnetic carriers by sharing the unit. The magnetic carriers are grouped in a cluster in conjunction with the individual magnetic transducers and the cluster is thereafter serviced by the common electronic unit. In this system, however, only one carrier can be accessed at a time. This apparatus has severe limitations in that the data processor generally has the capabilities of handling the information from a plurality of the magnetic carriers simultaneously.

SUMMARY OF THE INVENTION

Thus the present invention includes plural electronic units which are shared by the plural magnetic carriers to provide access to more than one carrier at a time while still reducing the total number of expensive electronic units or buffers. In the present invention there is provided a system having a plurality of magnetic carriers with a number of information channels on the carriers. Further, there is a magnetic transducer associated with each channel of the magnetic carrier and each transducer has a read core and a write core with a plurality of windings on at least one of the cores. A plurality of electronic units are provided, the number of which corresponds to the number of windings on the magnetic transducer that has the greatest number of windings. Each electronic unit has as many read or write amplifiers as there are channels on the magnetic carriers and is coupled to one of the windings of each magnetic transducer. Thereafter, the particular magnetic transducer that is to be employed is selectable through a selection means associated with each electronic unit. Thus, each electronic unit is efficiently shared by two or more magnetic carriers and a plurality of functions can be performed simultaneously with respect to one or more of the magnetic carriers.

The ability to perform a plurality of functions simultaneously, for example reading from two magnetic carriers at once, or writing on two magnetic carriers, or reading and writing on one carrier while reading and writing on another carrier, or any combination of these, is provided in accordance with the present invention by employing magnetic transducers that have a plurality of windings on either the read core or write core or both. Each winding is coupled to a selected electronic unit whereafter it may be selectively employed by the operation of the selection unit associated with each magnetic transducer.

BRIEF DESCRIPTION OF THE DRAWING

These and other features and advantages of the present invention may be understood more clearly and fully upon consideration of the following specification and drawings in which:

In FIG. 1 a block diagram of a data processing system is shown. The system employs a magnetic storage system which includes a magnetic carrier 1 and two magnetic transducers 2 and 3. The magnetic carrier 1 is representatively shown as a magnetic tape but also may be any other magnetic carrier such as a magnetic disc. The magnetic transducers 2 and 3 constitute a read head and a write head which may be fastened in a dual-gap configuration as disclosed in U.S. Pat. No. 3,249,928.

Figure 1:
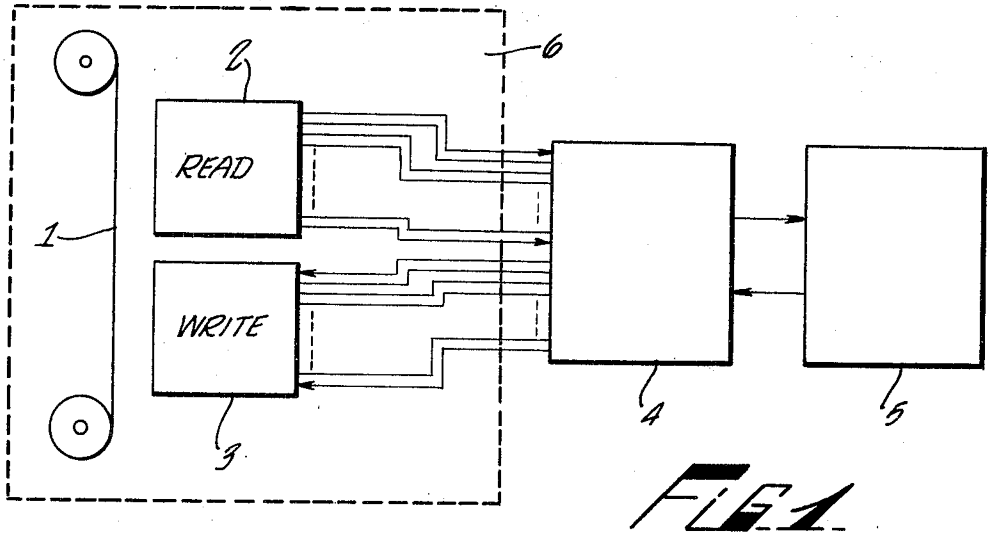
FIG. 1 is a pictorial diagram of a data processings system using a magnetic storage system.

There are as many cores on the magnetic transducers 2 and 3 as there are tracks or channels of information on the magnetic carrier 1. The combination of the magnetic transducers 2 and 3 and the magnetic carrier 1 constitutes a station 6 in a data processing system. The magnetic transducers 2 and 3 are coupled to an electronic unit 4 that includes amplifiers for amplifying the signal that is either read from the magnetic carrier or that is to be stored in the magnetic carrier. The electronic unit 4 couples the magnetic transducers 2 and 3 to the computer or data processor 5. In the magnetic storage system of FIG. 1 the electronic unit is associated with only one station.

Figure 2:
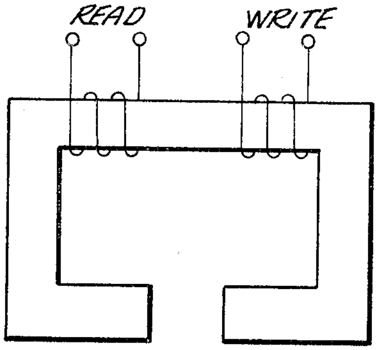
FIG. 2 is a schematic diagram of a single function read/write head.

The read/write head of the magnetic storage system of FIG. 1 may have a dual-gap configuration or alternatively, the read/write windings may be positioned on a common core as shown in FIG. 2 so that only one function may be performed at a time.

When employing a plurality of magnetic carriers rather than a single continuous magnetic carrier each magnetic carrier has a magnetic transducer associated therewith for retrieval of information from or for storing information in the magnetic carrier. In the past, it has been the practice to provide an electronic unit including the amplifiers for the reading and writing functions for each station or tape transport system, as shown in FIG. 1. This is very expensive and the resulting apparatus is also very bulky. Thus, it is desirable to employ a common electronic unit for two or more magnetic carriers which may be combined to form a tape cluster when the magnetic carriers are in the form of magnetic tapes.

Because of the ability of the data processor or computer to simultaneously handle information from a plurality of magnetic carriers, it is desirable to have access to more than one magnetic carrier at a time. Thus, in accordance with the present invention there is provided additional electronic units and additional windings on the cores of the magnetic transducers. If a single core is employed for both reading and writing at each station of the tape cluster, then additional windings for the reading function and the writing function are added to the core as shown in FIG. 3.

Figure 3A:
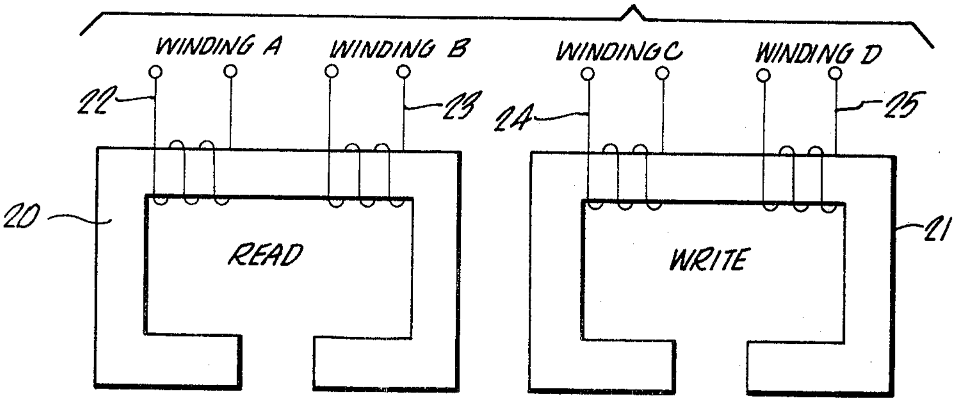
FIG. 3A is a schematic diagram of a dual-gap magnetic transducer in accordance with the present invention, wherein the read core and the write core each have a plurality of individual windings.
Figure 3:
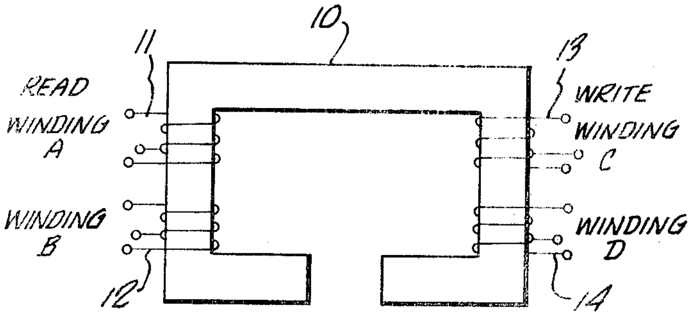
FIG. 3 is a schematic diagram of a read/write head in accordance with the present invention having a plurality of read windings or write windings on a single core.

The core 10 of FIG. 3 has two read windings 11 and 12 and two write windings 13 and 14. Thus, the information retrieved by the magnetic transducer having the core 10 will appear on winding 11 and winding 12. The output may be taken from either of these windings.

Similarly, the information may be stored on the magnetic carrier by the magnetic transducer of FIG. 3 by coupling the information to either write winding 13 or write winding 14.

An alternative embodiment for the magnetic transducer of the present invention is shown in FIG. 3A wherein the reading and writing function is performed by two separate cores, such as is found in dual-gap winding. Core 20 performs the reading function and core 21 performs the writing function. Each of the cores 20 and 21 have plural windings thereon in accordance with the present invention. Read core 20 has two windings 22 and 23 which are also designated winding A and winding B, respectively. Similarly, the write core 21 has two windings 24 and 25 which are designated winding C and winding D, respectively.

Figures 4, 4A:
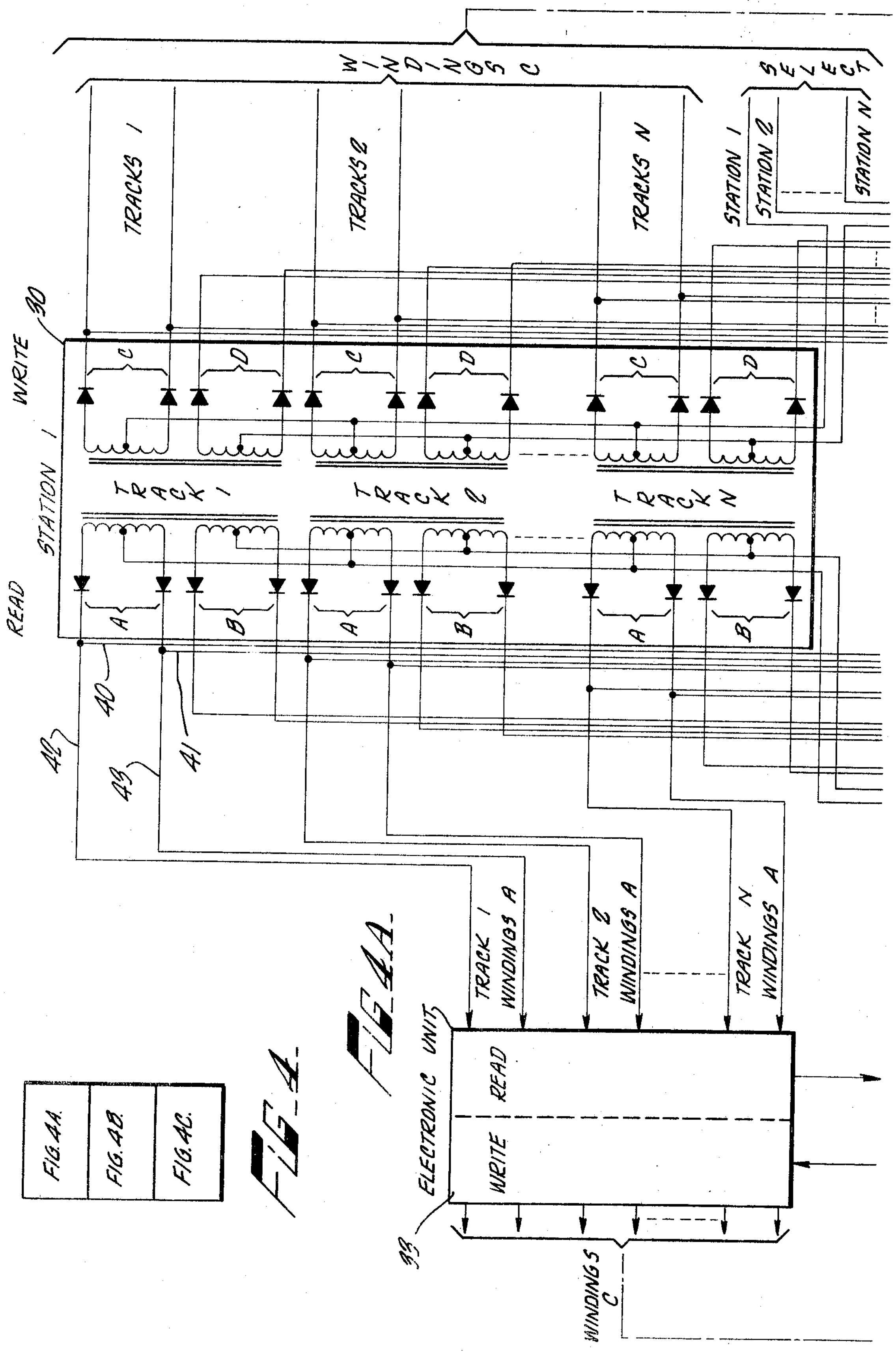
FIGS. 4A, 4B, and 4C, positioned as shown in the key of FIG. 4, depict a schematic circuit diagram partially in block form of one embodiment of the present invention showing the sharing of common electronics by magnetic transducers having a plurality of windings on either the read or write cores or both cores.
Figure 4B:
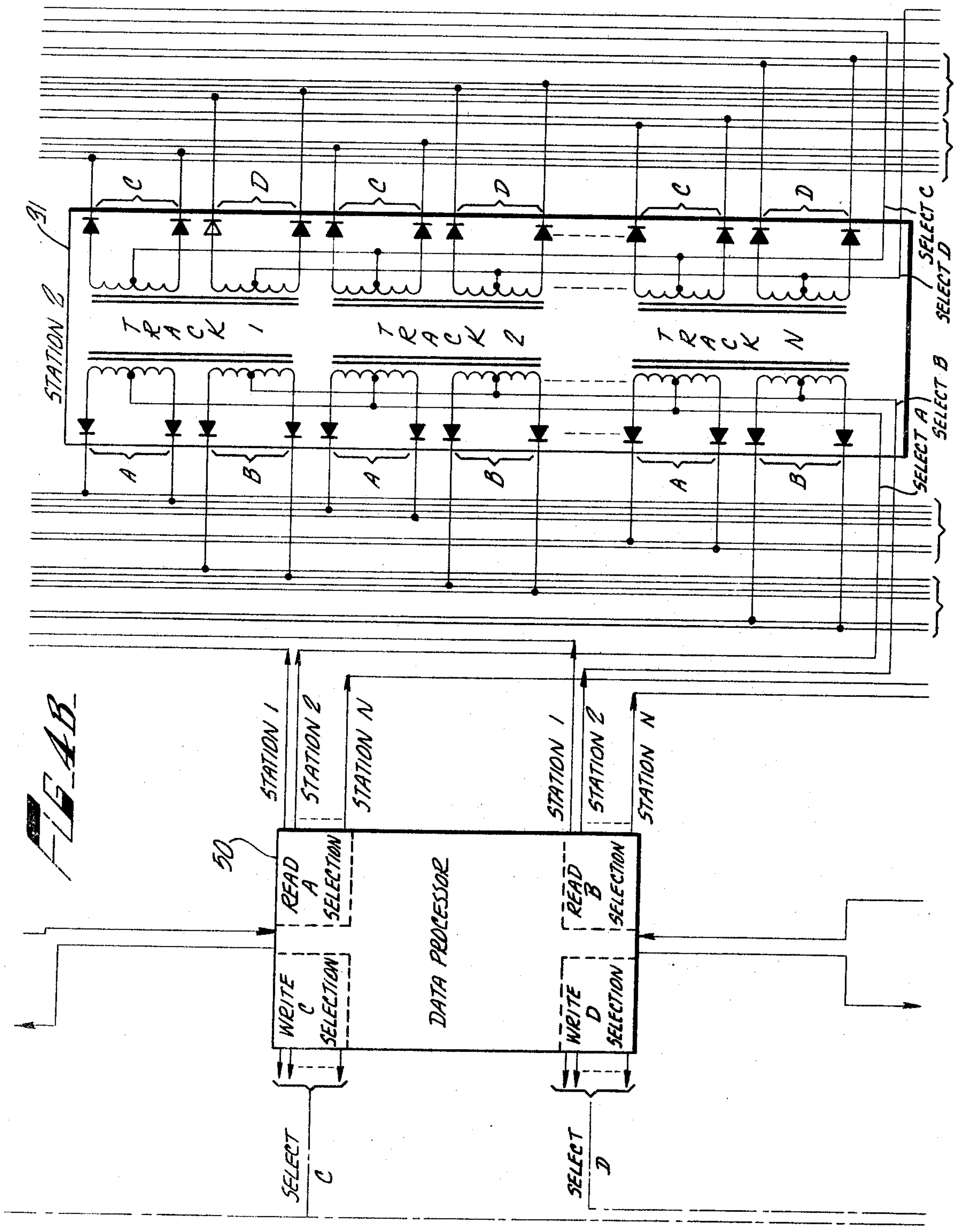
Figure 4C:
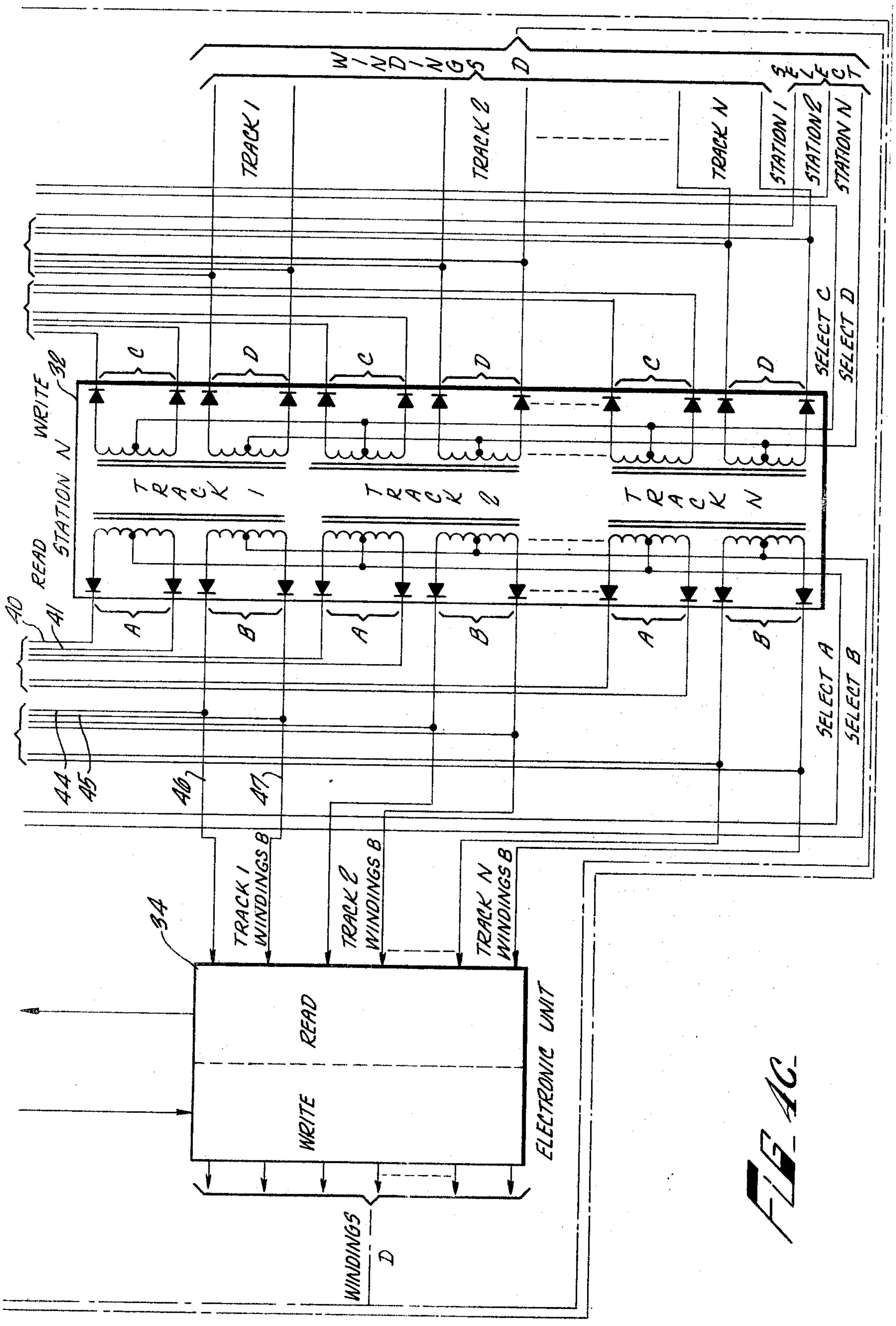

The plural winding cores of the magnetic transducers having the dual-gap configuration of FIG. 3A are connected in the data processing system as shown in the schematic diagram of FIGS. 4A, 4B, and 4C, positioned as shown in FIG. 4. Each station of the cluster has as many read cores and write cores as there are tracks on the magnetic carrier that is associated with the station. The magnetic carrier may be for example a magnetic tape of the type that has seven tracks or channels. Then, the station associated with this magnetic carrier will have seven separate read cores and seven separate write cores.

The magnetic transducer 30 at station 1 in FIG. 4A has as many cores as there are tracks N on the magnetic carrier. Similarly, the magnetic transducers 31 and 32 for stations 2 and *n*, respectively, have as many cores as there are tracks on the magnetic carrier associated with those particular stations.

In the magnetic storage system of FIGS. 4A, 4B, and 4C there is provided two electronic units 33 and 34 which correspond to the two windings on each core of the magnetic transducers 30, 31, and 32. Each electronic unit has a write section and a read section. The electronic unit 33 is associated with the A and C windings of the magnetic transducers and electronic unit 34 is associated with the B and D windings of the magnetic transducers.

Magnetic transducer 30 being of the dual-gap configuration has a read core generally shown on the left in FIG. 4A, and a write core generally shown on the right in FIG. 4A. Each read core has two windings designated as winding A and winding B. Each winding of the read core is associated with one of the electronic units 33 or 34, and is directly coupled to the input of one of these units. Furthermore, the windings A and B of every other magnetic transducer which includes transducers 31 and 32 are associated with the respective electronic units 33 and 34 and coupled thereto. Thus, track 1, winding A of each magnetic transducer is coupled together and coupled in common to the input of electronic unit 33. Winding A of the read core for track 1 at station 1 is coupled by leads 40 and 41 to winding A of the read core of track 1 at station 2. Similarly, winding A of the read core for track 1 at station 1 is coupled to winding A for track 1 of every other station by leads 40 and 41. Thereafter, winding A of the read core for track 1 of every station is coupled to the input of electronic unit 33 for track 1 by leads 42 and 43. Similarly, windings B of the read core for track 1 at each station are coupled together through leads 44 and 45 and are thereafter coupled in common through leads 46 and 47 to the track 1 input of electronic unit 34.

In a similar manner, windings A and windings B of the read cores for tracks 2 through N of each station are coupled to the respective windings of the other stations and to the input for the particular track at the electronic units 33 and 34. The windings C and D for the write cores are also interconnected and connected in common to the respective inputs of the write portions of the electronic units 33 and 34. The electronic units 33 and 34 are coupled to a data processor or computer 50.

In the data processing system of FIGS. 4A, 4B, and 4C it is possible to retrieve information from any two stations, store information at two stations, or retrieve from one and store at the same one or a different one by selectively activating the desired cores. The activation of the cores and the selection is accomplished through the selection unit portion of the computer or data processor 50.

The ability to operate on the magnetic carriers at two or more stations is thus provided by the plural windings on a common core and the common connection of particular windings from each station to a common electronic unit.

Figure 5:
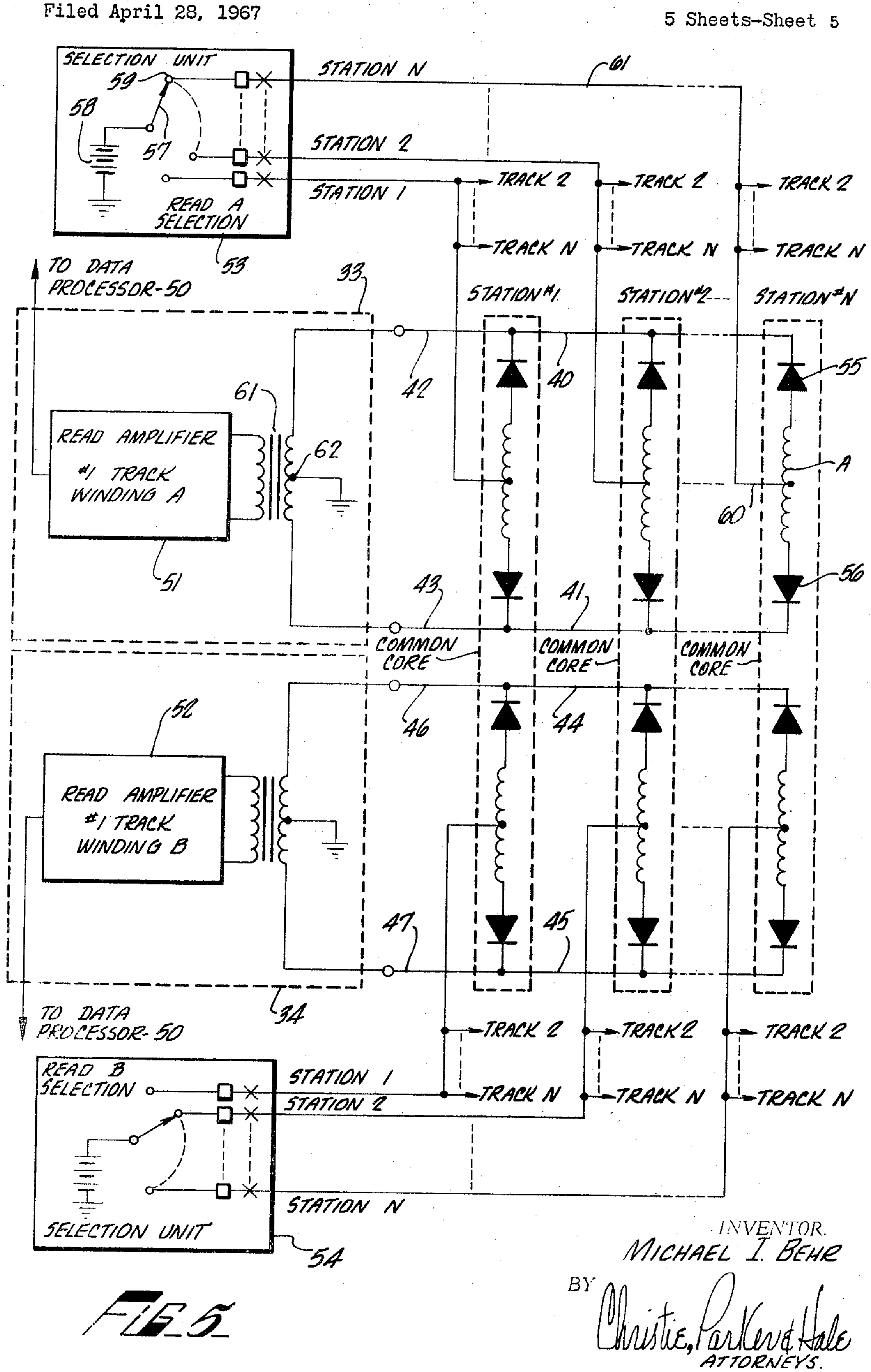
FIG. 5 is a schematic circuit diagram showing the details of a preferred selection unit of the present invention.

The operation of the magnetic storage system of the equipment shown in FIGS. 4A, 4B, and 4C for a read/read function is shown in detail in the schematic diagram of FIG. 5. Although the circuitry for a read/read function only is described in detail in connection with FIG. 5 it is to be understood that the performance of a read/write operation at two stations or the same station, and a write/write operation at two different stations are performed in the same manner. For purposes of explanation, the connection and electronics for only one track at each station is shown. However, it is to be understood that the connection and operation of the circuitry and electronics for the other tracks is the same.

The interconnection of the two windings on a common read core for track 1 at each station is shown in FIG. 5. In particular, leads 40 and 41 that interconnect winding A on the read core for track 1 at each station, 1 through N, is schematically shown in FIG. 5. It is to be understood that the windings A for the read cores for tracks 2 through N are similarly interconnected but are not shown in FIG. 5. The interconnection of the windings B for the read core of track 1 of stations 1 through N is also shown in FIG. 5, while the similar interconnection of winding B for tracks 2 to N is not shown. Winding B of the read core for track 1 at each station is interconnected by leads 44 and 45 which are connected to the input to the electronic unit 34 by leads 46 and 47. Only the read amplifiers 51 and 52 of the electronic units 33 and 34, respectively, are shown in FIG. 5. These read amplifiers are for track 1 only and it is to be understood that the read amplifiers for tracks 2 through N are also located within the electronic units 33 and 34, although not shown on FIG. 5.

The means for selecting the winding and station to be employed in the particular operation selected includes an effective switch in each winding to render the winding operative. In the case of the data processing system of FIG. 5, these switches are diodes connected in the conduction path of the winding. The switches are responsive to a selection unit associated with the computer or data processor 50 which in the example of FIG. 5 applies a forward bias to the diodes in the selected winding to make the winding operative to either retrieve information from its associate magnetic carrier or to store information in the carrier.

Selection units 53 and 54 associated with the computer or data processor 50 for selectively permitting a particular station to be coupled to the read amplifiers of the electronic unit are shown in FIG. 5.

The windings on each core at the stations 1 through N are effectively isolated from the read amplifiers by diodes positioned between the windings and the wire connecting the windings to the amplifiers. The diodes are part of the selection circuit and when properly energized permit the signal appearing on the selected winding to be coupled to the read amplifier and thereafter to the data processor or computer 50.

It is assumed, for illustrative purposes, that the information on the magnetic carrier associated with station *n* and the magnetic carrier associated with station 2 is to be retrieved during the illustrative read/read operation. Station *n* is selected to be read by energizing or forward-biasing diodes 55 and 56 that are connected in series with the winding on the read core for track 1 at station *n*. Similarly, the potential that forward-biases the diodes 55 and 56 will forward bias the diodes in the read cores in the other tracks for station *n*.

The diodes are forward-biased through the selection unit 53 wherein there is provided a mechanical switch 57 and a battery or source of potential 58. It is understood that the mechanical switch is for illustrative purposes only and may be replaced by a suitable electronic switch. When it is desired to retrieve information stored on the magnetic carrier associated with station *n*, the mechanical switch 57 of the selection unit 53 is moved to make contact with a terminal point 59 to complete the circuit through the winding on the read core at station *n*. With the mechanical switch 57 in the position shown in FIG. 5 the battery 58 forward-biases diodes 55 and 56 and the corresponding diodes in tracks 2 through N of station *n*.

The path of current flow from the battery 58 is through the switch 57 and terminal 59 to the center tap 60 of winding A at station *n*. The terminal 59 is coupled to the center tap 60 by lead 61. The direct current will divide at the center tap 60 of winding A and half will flow through diode 55 and the other half will flow through diode 56. The direct current flowing through diodes 55 and 56 will be coupled by leads 40 and 41 and leads 42 and 43 to the input of the read amplifier for track 1 of the electronic unit 33. The direct current will thereafter flow through the primary of transformer 63, one-half flowing through the top half and the remaining half of the direct current flowing through the bottom half of the primary of the transformer. The direct current will then flow out of the center tap 62 to return to the negative terminal of the battery 58 through ground reference. Thus, approximately equal magnitudes of direct current flow in opposite directions through winding A and the primary of transformer 63 with the added advantage that the direct current will have no net effect on the information that is being retrieved from the magnetic carrier associated with station *n*.

Once diodes 55 and 56 are forward-biased, information on the carrier associated with winding A at station *n* will be retrieved and transmitted to the computer or data processor 50 after being amplified in the shared electronic unit 33.

Selection unit 54 operates in a similar manner to retrieve information from station 2 when the switch of unit 54 is in the position shown in FIG. 5.

Thus, two functions may be simultaneously performed at the same or different stations in a simple and economical manner. If it is desired to perform more functions simultaneously, such as read/read/write, then it is only necessary to provide an additional electronic unit to be shared by an additional winding on either the read or write core of each magnetic transducer and an additional selection unit for the added winding.

In this regard, the electronic units 33 and 34 of FIGS. 4A and 4C could also be four individual units, two of which would include read amplifiers and the other two would include write amplifiers. In any case, a selection means is associated with each winding and the amplifiers to which it is coupled.

What is claimed is:

1. In a data processing system having a plurality of magnetic carriers with a plurality of information channels thereon, a group of magnetic transducers associated with each carrier and forming a station, each transducer associated with a particular information channel on said carrier, each magnetic transducer having a read core, a write core, more than one winding on one core, with each winding thereon being separately selectable, and at least one separately selectable winding on the other core; a plurality of electronic units, each designed for operating on the signal read from a magnetic carrier or for operating on the signal used to write on a magnetic carrier; means for coupling one winding from one transducer at each station in common to one electronic unit with each electronic unit having commonly-coupled windings from a plurality of individual transducers at each station coupled thereto; and a selection means for simultaneously selectively activating one particular winding from transducers at one station while selectively activating another particular winding from transducers at at least the same or a different station.

2. In a data processing system in accordance with claim 1 wherein each winding has a center tap and the selection means comprises a pair of diodes connected at opposite ends of the winding in series with each winding on the cores of the magnetic transducer, a source of potential and a multi-position switch having its common terminal connected to the source of potential and its individual contacts connected individually to the center tap of one of the windings of each transducer at a station.

3. In a data processing system, a plurality of magnetic tapes having a plurality of information channels; a magnetic tape read/write head associated with each channel; each read/write head having a read core, a write core, a first and second read winding, each read winding being selectable independently of all other windings on the head, and a first and second write winding, each write winding being selectable independently of all other windings on the head, a first and a second electronic unit for reading; a first and a second electronic unit for writing; means for coupling all of the first read windings to the first read electronic unit, means for coupling all of the second read windings to the second read electronic unit, means for coupling all of the first write windings to the first write electronic unit, means for coupling all of the second write windings to the second write electronic unit, and a diode switching circuit for selectively activating all of the windings associated with a selected tape that are coupled to a selected electronic unit.

4. In a data processing system, the combination comprising a plurality of magnetic carriers having a plurality of information channels, a group of magnetic transducers associated with each carrier and forming a station, the number of transducers being equal to the number of channels on the carrier, each magnetic transducer having a read core, a write core, a first and a second winding on the read core for individually retrieving information from its associated magnetic carrier, each winding being selectable independently of all other windings of the transducer; a first and a second winding on each write core for individually storing information on the associated carrier, each winding being selectable independently of all other windings of the transducer; a first electronic unit having a plurality of read amplifiers equal to the number of channels on the magnetic carrier, plural means for coupling the read winding of one of the magnetic transducers at each station to one of the amplifiers in the first electronic unit, said coupling means being equal in number to the number of transducers at a station whereby all of the first read windings are connected to an amplifier in the first electronic unit, a second electronic unit having a plurality of read amplifiers equal to the number of channels on the magnetic carrier, plural means for coupling the second read winding of one magnetic transducer at each station in common to one of the amplifiers in the second electronic unit, said coupling means being equal in number to the number of transducers at a station whereby each second read winding is connected to an amplifier in said electronic unit, a third electronic unit having a plurality of write amplifiers equal to the number of channels on the magnetic carrier, plural means for coupling the first write winding of one transducer at each station in common to one of the write amplifiers in the third electronic unit, whereby all of the first write winding at each station is connected to a write amplifier in said third electronic unit, a fourth electronic unit having a plurality of write amplifiers equal to the number of channels on the magnetic carrier, plural means for coupling the second write winding of one magnetic transducer at each station in common to one of the write amplifiers in the fourth electronic unit, said coupling means being equal in number to the number of transducers at a station, whereby all of the second write windings at each station is coupled to an amplifier in said fourth electronic unit; a first selection means associated with the first read windings of each station, a second selection means associated with the second read windings of each station, a third selection means associated with the first write windings of each station, and a fourth selection means associated with the second write windings at each station, each selection means including a center tap on each winding, a pair of diodes connected in series with each winding, a source of potential and a switch for selectively coupling the source of potential to the center tap of its associated winding in a selected individual station to activate those windings so that its designated function may be performed.

5. In a data processing system having a plurality of magnetic carriers with a plurality of information channels thereon, a group of magnetic transducers associated with each carrier and forming a station, each transducer associated with a particular information channel on said carrier, each magnetic transducer having a magnetic core, at least one write winding on the core selectable independently of other windings on the core and at least one read winding on the core selectable independently of other windings on the core; a plurality of electronic units for operating on the signal read from a magnetic carrier or applied to a magnetic carrier; means for coupling one winding from one transducer at each station in common to one electronic unit with each electronic unit having commonly-coupled windings from a plurality of individual transducers at each station coupled thereto; and a selection means for simultaneously selectively activating one particular winding from transducers at one station while selectively activating another particular winding from transducers at at least the same or a different station.

6. In a data processing system having a plurality of magnetic carriers with a plurality of information channels thereon, a group of magnetic transducers associated with each carrier and forming a station, each transducer associated with a particular information channel on said carrier, each magnetic transducer having a magnetic core, at least one write winding on the core selectable independently of other windings on the core and at least one read winding on the core selectable independently of other windings on the core; a plurality of electronic units for operating on the signal read from a magnetic carrier or for operating on the signal used to write on a magnetic carrier with more than two electronic units being associated either with the reading function or with the writing function and at least one electronic unit associated with the other function; means for coupling one winding from one transducer at each station in common to one electronic unit with each electronic unit having commonly-coupled windings from a plurality of individual transducers at each station coupled thereto; and a selection means for simultaneously selectively activating one particular winding from transducers at one station while selectively activating another particular winding from transducers at at least the same or a different station.

References Cited

UNITED STATES PATENTS

| | | | |
|---|---|---|---|
| 2,941,190 | 6/1960 | Lindley | 340—174.1 |
| 3,209,339 | 9/1965 | Blaustein et al. | 340—174.1 |

BERNARD KONICK, Primary Examiner

W. F. WHITE, Assistant Examiner

U.S. Cl. X.R.

340—166